United States Patent
Wei

(10) Patent No.: US 10,299,020 B2
(45) Date of Patent: *May 21, 2019

(54) METHOD AND APPARATUS FOR SIGNAL PROCESSING BY LIGHT WAVEFORM SHAPING

(71) Applicant: NATIONAL SUN YAT-SEN UNIVERSITY, Kaohsiung (TW)

(72) Inventor: Chia-Chien Wei, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/021,470

(22) Filed: Jun. 28, 2018

(65) Prior Publication Data
US 2018/0310079 A1  Oct. 25, 2018

Related U.S. Application Data

(63) Continuation of application No. 15/379,715, filed on Dec. 15, 2016.

(51) Int. Cl.
| | |
|---|---|
| *H04Q 11/00* | (2006.01) |
| *H04B 1/00* | (2006.01) |
| *H04B 10/27* | (2013.01) |
| *H04B 10/50* | (2013.01) |
| *H04B 10/516* | (2013.01) |
| *H04B 10/40* | (2013.01) |

(52) U.S. Cl.
CPC ....... *H04Q 11/0005* (2013.01); *H04B 1/0028* (2013.01); *H04B 10/27* (2013.01); *H04B 10/503* (2013.01); *H04B 10/516* (2013.01); *H04B 10/40* (2013.01); *H04Q 2011/0013* (2013.01); *H04Q 2011/0039* (2013.01)

(58) Field of Classification Search
None
See application file for complete search history.

(56) References Cited

U.S. PATENT DOCUMENTS

| | | | | |
|---|---|---|---|---|
| 5,241,414 | A * | 8/1993 | Giles ................. | H01S 3/094003 359/341.33 |
| 2005/0152026 | A1* | 7/2005 | Chen ..................... | H01S 5/5072 359/337 |
| 2006/0127103 | A1* | 6/2006 | Mazurczyk .......... | H04B 10/505 398/188 |
| 2014/0016940 | A1* | 1/2014 | Gottwald ............. | H04B 10/272 398/79 |
| 2014/0062738 | A1* | 3/2014 | Wu ..................... | H03M 1/0626 341/118 |

(Continued)

*Primary Examiner* — Mina M Shalaby
(74) *Attorney, Agent, or Firm* — Rosenberg, Klein & Lee

(57) ABSTRACT

A method and apparatus for signal processing by light waveform shaping are provided to process an uplink signal generated by a digital-to-analog converter (DAC) and/or process a downlink signal to be transmitted to an analog-to-digital converter (ADC). The method includes adjusting the waveform of the uplink signal and/or the waveform of the downlink signal with a light waveform shaping module so that, even if the DAC and/or ADC has a low sampling rate and a narrow bandwidth, a high-frequency signal portion of the uplink signal and/or a high-frequency signal portion of the downlink signal can be preserved.

4 Claims, 5 Drawing Sheets

(56) References Cited

U.S. PATENT DOCUMENTS

| | | | |
|---|---|---|---|
| 2014/0362874 A1* | 12/2014 | Nishimoto | H04B 10/40 370/535 |
| 2016/0065311 A1* | 3/2016 | Winzer | H04B 10/2504 398/193 |
| 2016/0112123 A1* | 4/2016 | Chen | H04B 10/07955 398/38 |
| 2016/0270080 A1* | 9/2016 | Zeng | H04W 72/0453 |
| 2016/0308641 A1* | 10/2016 | Zeng | H04B 10/5561 |
| 2016/0372887 A1* | 12/2016 | Redman-White | H01S 5/06835 |
| 2016/0373208 A1* | 12/2016 | Liu | H04B 10/25 |
| 2017/0093497 A1* | 3/2017 | Ling | H04B 10/25133 |

\* cited by examiner

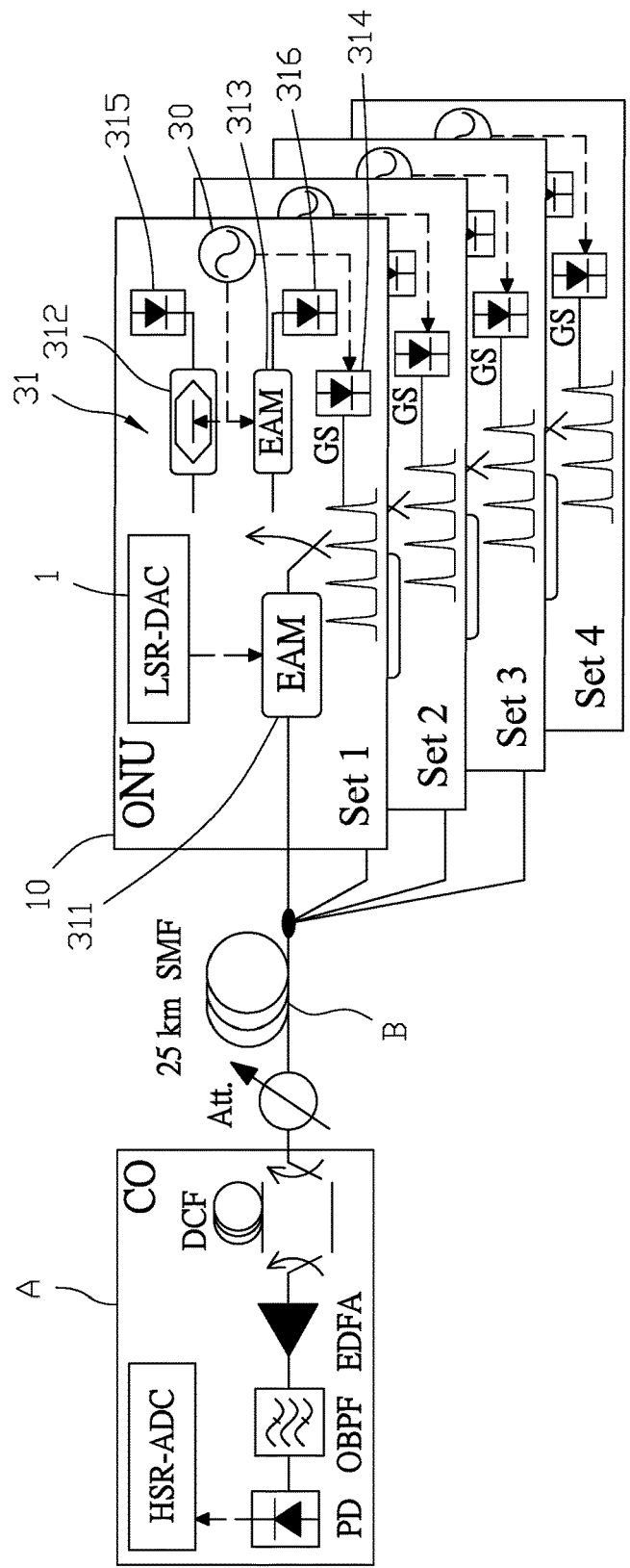
F I G . 2

METHOD AND APPARATUS FOR SIGNAL PROCESSING BY LIGHT WAVEFORM SHAPING

CROSS-REFERENCE TO RELATED APPLICATIONS

This application is a continuation application of U.S. patent application Ser. No. 15/379,715, filed on Dec. 15, 2016.

BACKGROUND OF THE INVENTION

1. Technical Field

The present invention relates to a method and apparatus for signal processing and more particularly to a method and apparatus for processing an uplink signal and/or a downlink signal by a light waveform shaping technique.

2. Description of Related Art

The sampling rate of a conventional analog-to-digital converter (ADC) or digital-to-analog converter (DAC) is in direct proportion to the bandwidth of the converter, and yet the latest signal processing techniques, such as the delay-division-multiplexing OFDMA (orthogonal frequency-division multiple access) passive optical network (DDM-OFDMA PON) technique, require a converter with a low sampling rate and a wide bandwidth. While the development of the latter converter contributes greatly to reducing power consumption and simplifying computation, extensive use of such converters is difficult to achieve.

BRIEF SUMMARY OF THE INVENTION

In order for a conventional converter, whose sampling rate is in direct proportion to the converter's bandwidth, to satisfy the need for a low-sampling-rate yet wide-bandwidth converter, the inventor of the present invention provides a method for signal processing, or more particularly for processing an uplink signal generated by an analog-to-digital converter (ADC) and/or processing a downlink signal to be transmitted to a digital-to-analog converter (DAC), by light waveform shaping. The method includes adjusting the waveform of the uplink signal and/or the waveform of the downlink signal with a light waveform shaping module so that a high-frequency signal portion of the uplink signal and/or a high-frequency signal portion of the downlink signal is preserved even though the ADC and/or the DAC has a low sampling rate and a narrow bandwidth.

Preferably, the light waveform shaping module includes an optical modulation module for turning the uplink signal into a light pulse signal to prevent suppression of a high-frequency image signal portion of the uplink signal.

Preferably, the light waveform shaping module includes an optical gating for suppressing code interference of the downlink signal and thereby eliminating the low-pass effect in order to preserve aliasing between the high-frequency signal portion and a low-frequency signal portion of the downlink signal.

The present invention also provides an apparatus for signal processing by light waveform shaping. The apparatus includes: a DAC for generating an uplink signal, an ADC for receiving a downlink signal, and a light waveform shaping module separately and electrically connected to the DAC and the ADC. The light waveform shaping module is configured for processing the uplink signal and/or the downlink signal in order to preserve a high-frequency signal portion of the uplink signal and/or a high-frequency signal portion the downlink signal.

Preferably, the light waveform shaping module includes an optical modulation module electrically connected to the DAC and configured for turning the uplink signal into a light pulse signal so that a high-frequency image signal portion of the uplink signal is not suppressed.

Preferably, the optical modulation module includes at least one optical modulator, and the at least one optical modulator may be either one or a combination of an electro-absorption modulator and a Mach-Zehnder interferometer.

Preferably, the light waveform shaping module includes an optical gating electrically connected to the ADC and configured for suppressing code interference of the downlink signal and thereby eliminating the low-pass effect in order to preserve aliasing between the high-frequency signal portion and a low-frequency signal portion of the downlink signal.

Preferably, the optical gating includes at least one optical modulator, and the at least one optical modulator may be either one or a combination of an electro-absorption modulator and a Mach-Zehnder interferometer. In addition, the optical gating is connected to an optical band-pass filter and a photodetector.

The present invention further provides an apparatus for signal processing by light waveform shaping, wherein the apparatus includes: a DAC for generating an uplink signal; an ADC for receiving a downlink signal; and a light waveform shaping module separately and electrically connected to the DAC and the ADC, configured for processing the uplink signal and/or the downlink signal, and including an optical modulation module and an optical gating. The optical modulation module turns the uplink signal into a light pulse signal to prevent suppression of a high-frequency image signal portion of the uplink signal. The optical gating suppresses code interference of the downlink signal so that the low-pass effect is eliminated to preserve aliasing between a high-frequency signal portion and a low-frequency signal portion of the downlink signal.

The foregoing technical features produce the following effects:

By applying the light waveform shaping technique, a high-frequency signal portion of the uplink signal and/or a high-frequency signal portion of the downlink signal can be preserved to overcome the limitation of using a low-sampling-rate and narrow-bandwidth ADC or DAC, and this helps put the DDM techniques into more extensive use.

BRIEF DESCRIPTION OF THE SEVERAL VIEWS OF THE DRAWINGS

FIG. 2 is a schematic circuit diagram of the embodiment in FIG. 1;

DETAILED DESCRIPTION OF THE INVENTION

The present invention incorporates the foregoing technical features into a method and apparatus for signal processing by light waveform shaping. The major effects of the method and apparatus can be readily understood by reference to the embodiment described below, where the DDM-OFDMA PON technique is applied by way of example.

Figure 1:
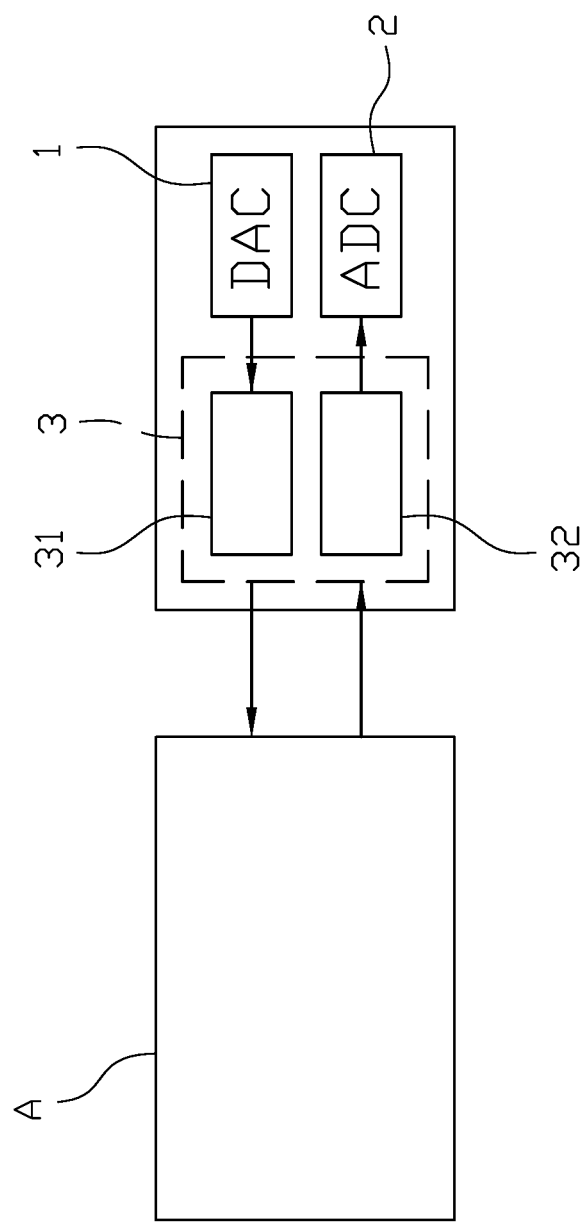
FIG. 1 is a system block diagram of an embodiment of the present invention.

Referring to FIG. 1 and FIG. 2, a central office (CO) A is connected to at least one optical network unit (ONU) 10 via a single-mode optical fiber B. Each ONU 10 includes one apparatus of the present invention for processing signals by light waveform shaping. The apparatus of the present invention includes a low-sampling-rate (LSR) narrow-bandwidth signal converter and a light waveform shaping module 3. The signal converter may be an LSR narrow-bandwidth digital-to-analog converter (DAC) 1 and/or an LSR narrow-bandwidth analog-to-digital converter (ADC) 2. The DAC 1 is configured to generate an uplink signal while the ADC 2 is configured to receive a downlink signal.

Figure 3:
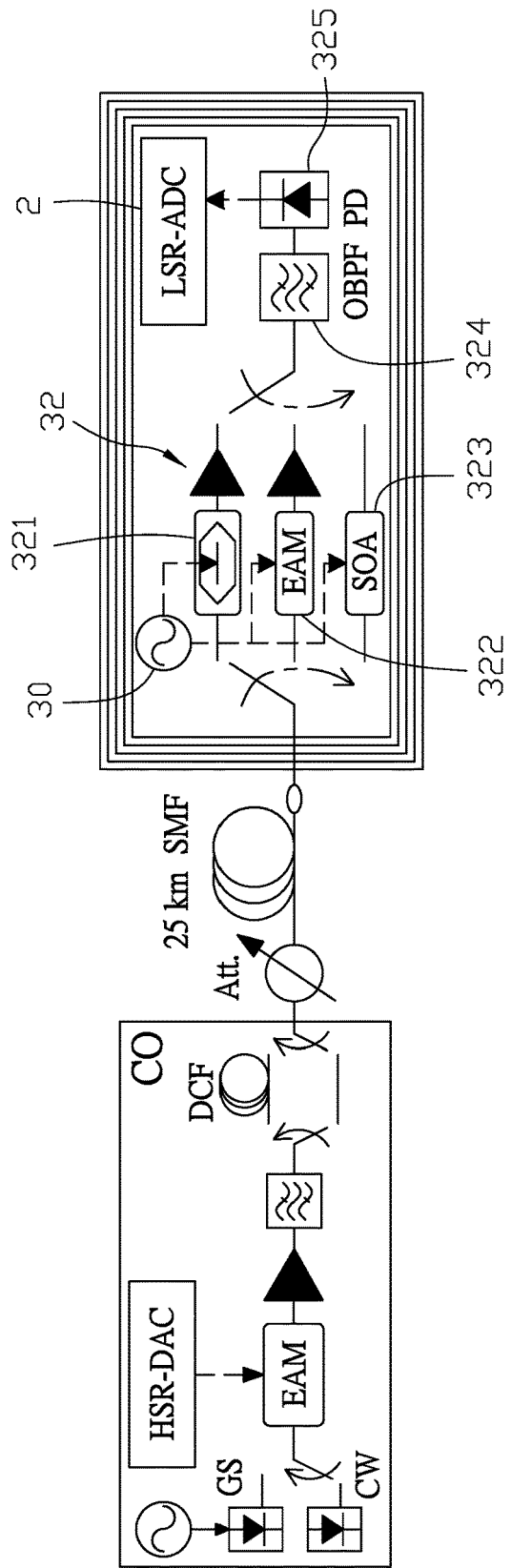
FIG. 3 is another schematic circuit diagram of the embodiment in FIG. 1.
Figure 4:
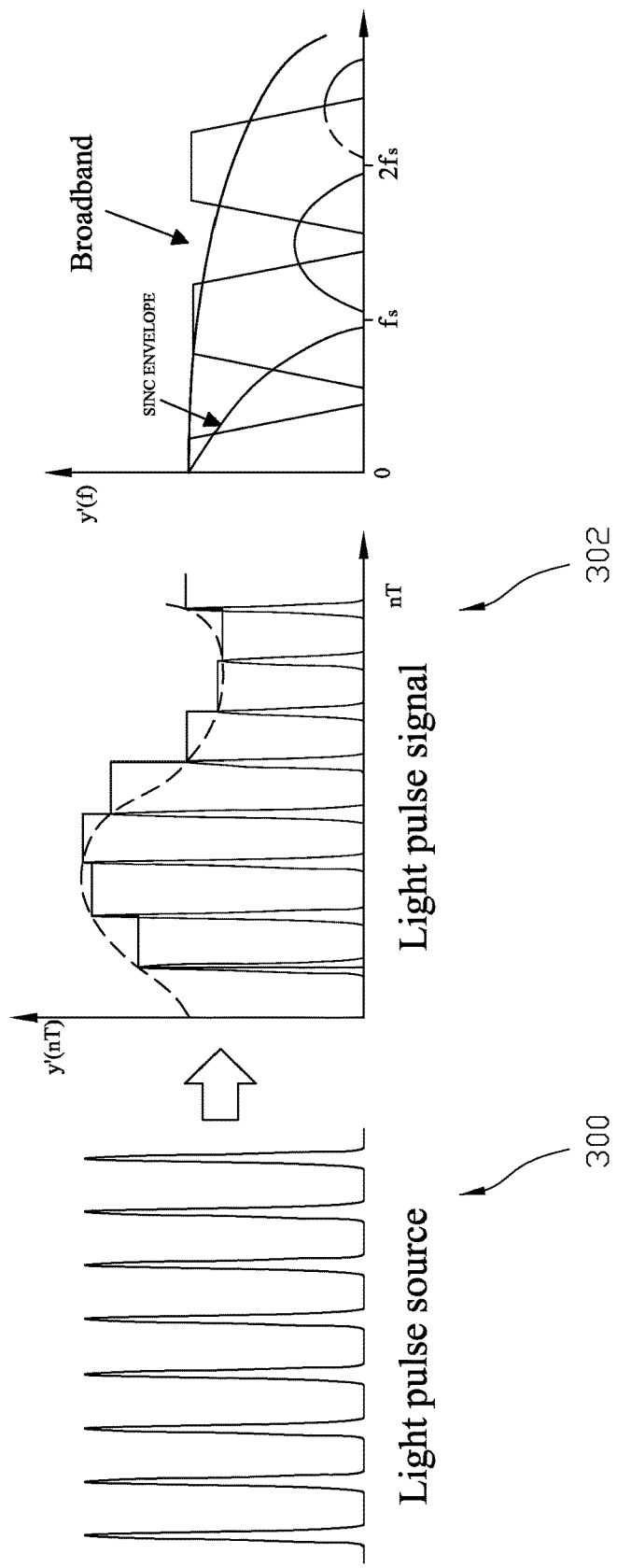
FIG. 4 schematically shows how an uplink signal is processed by the embodiment in FIG. 1.
Figure 5:
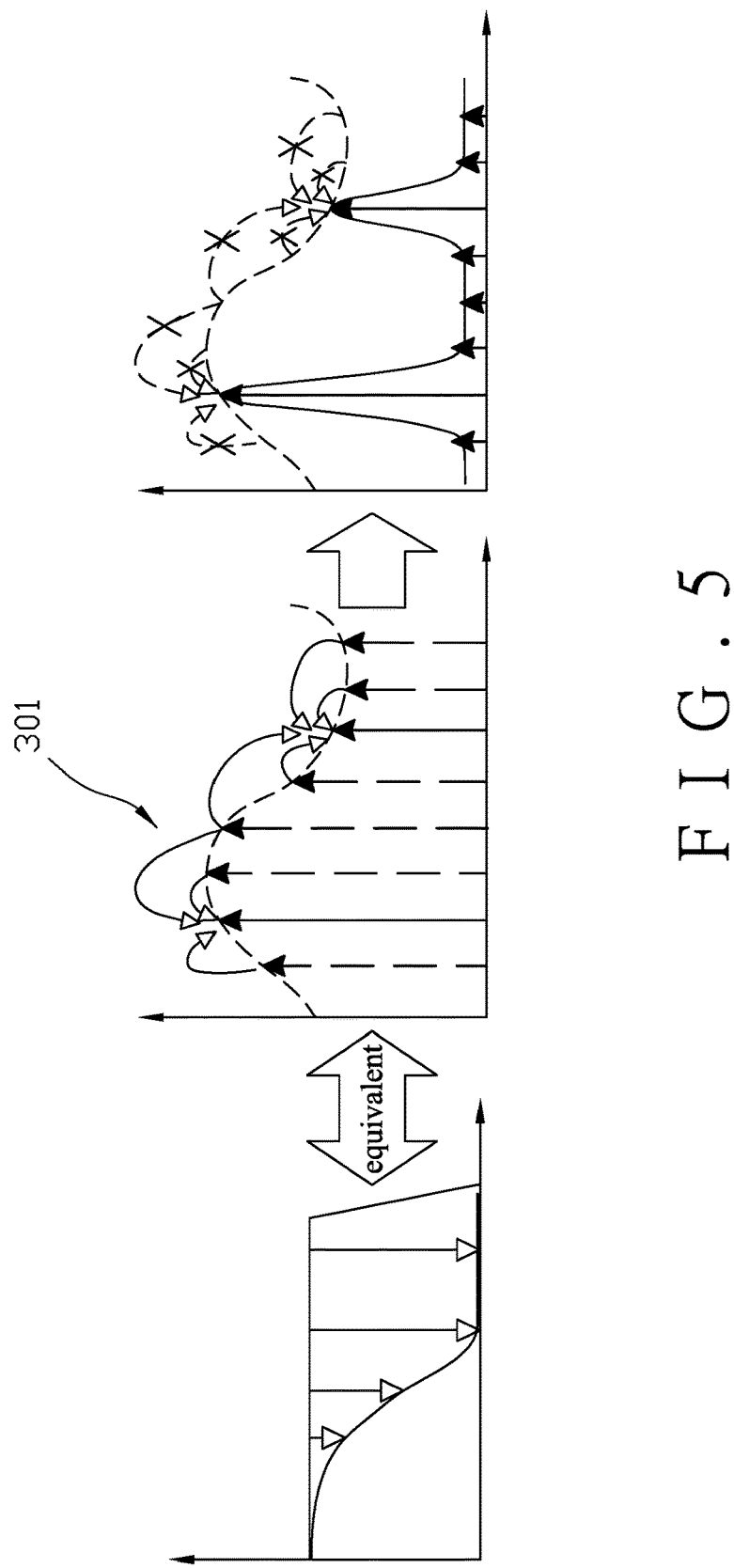
FIG. 5 schematically shows how a downlink signal is processed by the embodiment in FIG. 1.

As shown in FIG. 1 and FIG. 2, the light waveform shaping module 3 is separately and electrically connected to the DAC 1 and the ADC 2 and is configured to process the uplink signal and/or the downlink signal. The light waveform shaping module 3 includes an optical modulation module 31 and/or an optical gating 32. As shown in FIG. 2 and FIG. 4, the optical modulation module 31 is configured to turn the uplink signal into a light pulse signal 302, thereby preventing a high-frequency image signal portion of the uplink signal from be suppressed. As shown in FIG. 3 and FIG. 5, the optical gating 32 is configured to suppress code interference 301 of the downlink signal so that the low-pass effect is eliminated to preserve aliasing between a high-frequency signal portion and a low-frequency signal portion of the downlink signal. It should be pointed out that, in practice, the light waveform shaping module 3 may include only one of the optical modulation module 31 and the optical gating 32 and that, therefore, the light waveform shaping module 3 may be electrically connected to only one of the DAC 1 and the ADC 2 and hence capable of processing only one of the uplink signal and the downlink signal. In short, the light waveform shaping module 3 does not necessarily include both the optical modulation module 31 and the optical gating 32.

More specifically, with continued reference to FIG. 2 and FIG. 4, the optical modulation module 31 includes at least one optical modulator, which in this embodiment includes an electro-absorption modulator (EAM) 311. The EAM 311 is optically connected to a light pulse source 300 and is configured to generate the light pulse signal 302 by modulating the light pulse source 300. The light pulse source 300 may be generated by a Mach-Zehnder interferometer 312, another EAM 313, or a gain-switching (GS) pulse laser diode 314. The Mach-Zehnder interferometer 312 and the EAM 313 are respectively and optically connected to continuous-wave (CW) laser diodes 315 and 316 and are electrically connected to a sine-wave oscillator 30. The GS pulse laser diode 314 is also electrically connected to the sine-wave oscillator 30. The sine-wave oscillator 30 serves to either directly drive the GS pulse laser diode 314 to generate the light pulse source 300, or drive the Mach-Zehnder interferometer 312 and the EAM 313 to modulate the CW laser diodes 315 and 316 respectively in order to generate the light pulse source 300.

As shown in FIG. 3, the optical gating 32 includes at least one optical modulator, which in this embodiment includes a Mach-Zehnder interferometer 321, an EAM 322, and a semiconductor optical amplifier (SOA) 323. The Mach-Zehnder interferometer 321, the EAM 322, and the SOA 323 are all connected to the sine-wave oscillator 30. The sine-wave oscillator 30 controls losses of the Mach-Zehnder interferometer 321 and the EAM 322 or gain of the SOA 323 in order to turn on or off the downlink signal (i.e., the light waveform shaping operation). Moreover, the optical gating 32 is connected to an optical band-pass filter (OBPF) 324 and a photodetector 325. The OBPF 324 serves to filter out optical noise and may be dispensed with if so desired.

The above description of the embodiment should be able to enable a full understanding of the operation, use, and effects of the present invention. The embodiment, however, is only a preferred one of the invention and is not intended to be restrictive of the scope of the invention. All simple equivalent changes and modifications made according to the appended claims and the disclosure of this specification should be encompassed by the invention.

What is claimed is:

1. A method for signal processing by light waveform shaping, wherein the method is used to process an uplink signal generated by a first digital-to-analog converter (DAC) for uplink transmission to a second digital-to-analog converter (DAC) having a higher sampling rate than the first DAC, and process a downlink signal to be transmitted upon downlink transmission to an first analog-to-digital converter (ADC) from a second analog-to-digital converter having a higher sampling rate than the first ADC, the method comprising adjustably shaping a waveform of a light pulse signal component of the uplink signal by an optical modulation in amplitude of a light pulse source for the uplink signal, the light pulse source defining a higher frequency than the shaped waveform of the light pulse signal component, the uplink signal thereby preserving a high-frequency image content of the light pulse source and a lower frequency waveform of the light pulse signal component; and adjustably shaping a waveform of a light pulse signal component of the downlink signal by optical gating in amplitude of a light pulse source for the downlink signal, the light pulse source defining a higher frequency than the shaped waveform of the light pulse signal component, the downlink signal thereby preserving a high-frequency content of the light pulse source and a lower frequency waveform of the light pulse signal-component.

2. An apparatus for signal processing by light waveform shaping, comprising:

a signal converter configured as a first digital-to-analog converter for generating an uplink signal and a first analog-to-digital converter for receiving a downlink signal; and a light waveform shaping section electrically connected to the first digital-to-analog converter or the first analog-to-digital converter, wherein the light waveform shaping section is configured for adjustably shaping a waveform of a light pulse signal component of the uplink and downlink signals by optical modulation and optical gating in amplitude of a corresponding light pulse source, the light pulse source defining a higher frequency than the shaped waveform of the light pulse signal component, each of the uplink and downlink signals thereby preserving a high-frequency content of the light pulse source and a lower frequency waveform of the light pulse signal component;

wherein the uplink signal is generated by the first digital-to-analog converter for uplink transmission to a second digital-to-analog converter (DAC) having a higher sampling rate, and the downlink signal is generated upon downlink transmission to the first analog-todigital converter (ADC) from a second analog-to-digital converter having a higher sampling rate.

3. The apparatus of claim 2, wherein the light waveform shaping section includes at least one optical modulator, and the optical modulator includes one or more device selected from the group consisting of: an electro-absorption modulator, a Mach-Zehnder interferometer, and a gain-switching (GS) pulse laser diode.

4. The apparatus of claim 2, wherein the optical gating includes at least one optical modulator; the at least one optical modulator includes one or more device selected from the group consisting of: an electro-absorption modulator, a Mach-Zehnder interferometer, and a semiconductor optical amplifier; and the optical gating is connected to a photodetector.

* * * * *